US005770053A

United States Patent [19]

Chotel et al.

[11] Patent Number: 5,770,053

[45] Date of Patent: Jun. 23, 1998

[54] HYDRAULIC EQUIPMENT DRAINING MEANS

[75] Inventors: Henri Chotel, St. Fory; Max Roger; Alexis Albin, both of Toulouse, all of France

[73] Assignee: Societe Nationale Industrielle et Aerospatiale, Paris, France

[21] Appl. No.: 541,615

[22] Filed: Oct. 10, 1995

[30] Foreign Application Priority Data

Oct. 11, 1994 [FR] France .................................. 94 12107

[51] Int. Cl.[6] .................................................... B01D 21/24

[52] U.S. Cl. ......................... 210/97; 210/104; 210/416.1; 210/203; 184/6.2; 137/571; 137/892; 137/240

[58] Field of Search ................................... 210/321.6, 97, 210/104, 416.1, 203, 257.1; 55/219, 306, 421, 315; 184/6.2, 6.4; 137/571, 892, 240

[56] References Cited

U.S. PATENT DOCUMENTS

| | | | |
|---|---|---|---|
| 4,057,364 | 11/1977 | Bratschitsch | 137/205 |
| 4,169,225 | 9/1979 | Rickert et al. | 137/209 |
| 4,344,469 | 8/1982 | Brown | 137/892 |
| 4,673,006 | 6/1987 | Speck | 137/892 |
| 5,018,551 | 5/1991 | Pelissier | 137/571 |
| 5,024,687 | 6/1991 | Waller | 55/421 |
| 5,042,518 | 8/1991 | Singhe et al. | 137/209 |
| 5,101,936 | 4/1992 | Paredes | 184/6.4 |
| 5,531,240 | 7/1996 | Kelada | 137/240 |
| 5,590,678 | 1/1997 | Martinitz | 137/567 |

FOREIGN PATENT DOCUMENTS

| | | |
|---|---|---|
| 2102488 | 4/1972 | France . |
| 2623181 | 5/1989 | France . |

*Primary Examiner*—Ana Fortuna
*Attorney, Agent, or Firm*—Michael N. Meller

[57] ABSTRACT

A draining apparatus drains and dries hydraulic equipment such as aircraft circuits. The draining equipment includes a reservoir connected to the equipment by a suction line. (Venturi 20) which produces a vacuum in the reservoir responsive to compressed air injected by a line from an external compressed air source. If a calibrated valve is connected to an inlet of the equipment then a branch line of the equipment supplies part of the compressed air to the inlet connection of the equipment so that pressure which enters the equipment is inadequate to produce an overpressure at an outlet.

7 Claims, 1 Drawing Sheet

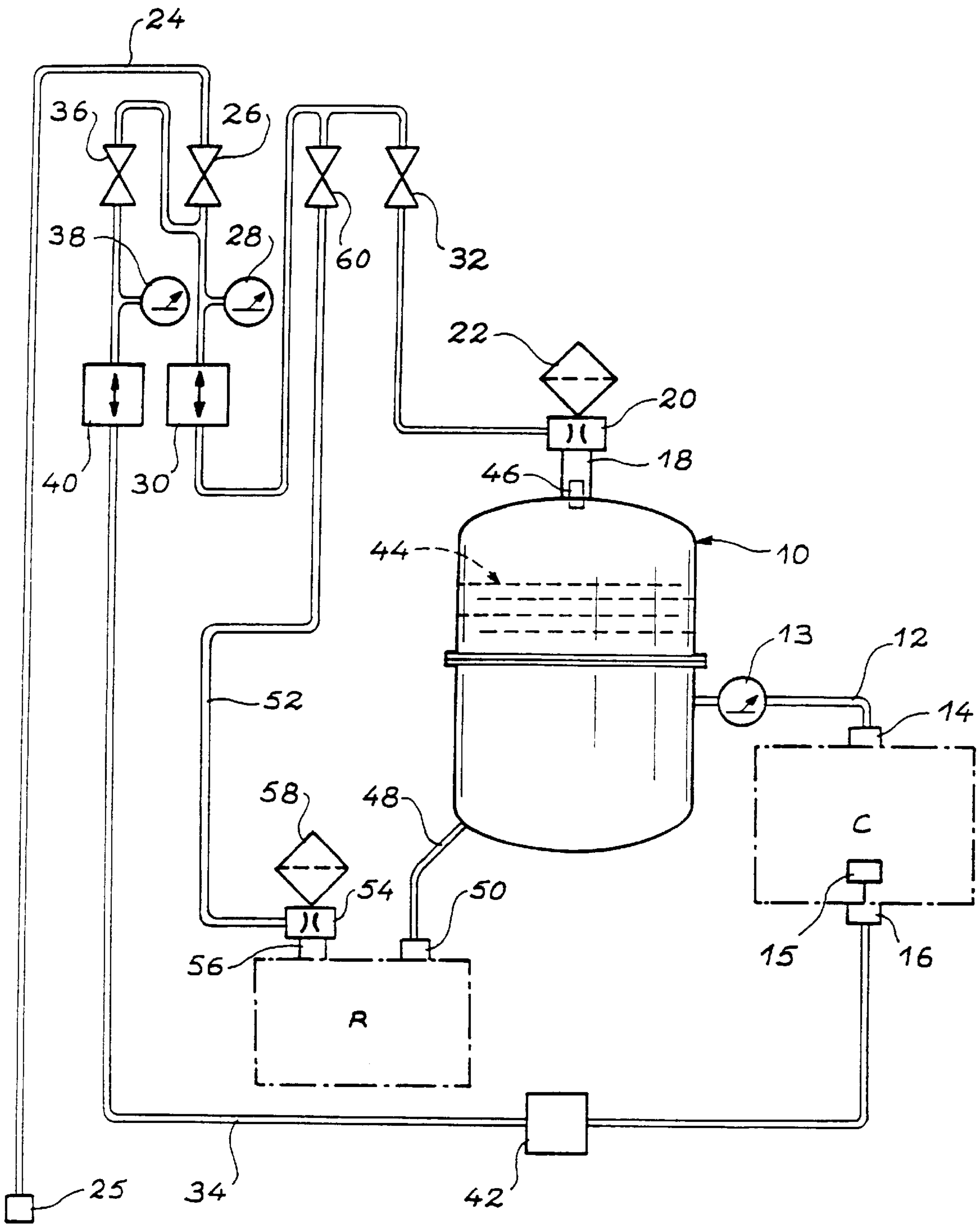
24
36
26
38
28
60
32
22
20
40
30
18
46
44
10
13
12
52
14
C
58
48
54
50
15
16
56
R
34
42
25

HYDRAULIC EQUIPMENT DRAINING MEANS

BACKGROUND OF THE INVENTION

The invention relates to hydraulic equipment draining means. More specifically, the invention relates to a stand or bench, herein referred to as means, for draining and drying hydraulic equipment such as aircraft circuits containing a corrosive or dangerous liquid. By extension, the draining means according to the invention can also be used for draining and drying other equipments (tanks, pipes, etc.) filled with liquid or for drying such equipment when they are not filled with liquid.

The special operating conditions of certain hydraulic circuits equipping aircraft lead to the use of special liquids such as "skydrol" (registered trademark). These special liquids are especially dangerous to man and the environment, particularly due to their highly corrosive character. When hydraulic equipment containing such liquids have to be drained, e.g. for carrying out certain maintenance operations, the safety of operators and the protection of the environment consequently make it necessary to avoid any handling of the liquid or spraying thereof towards the outside. However, this result cannot be achieved by any existing draining procedures.

DESCRIPTION OF THE PRIOR ART

Thus, the gravity draining procedure, which consists of placing the equipment to be drained above a container, allows the liquid and its vapour to spread to the outside. This procedure does not make it possible to dry the equipment and make all traces of the liquid disappear, so that there are still subsequent contact risks therewith.

Another known draining procedure consists of injecting compressed air into the equipment in order to entrain the liquid. However, liquid deposits remain in certain areas of the equipment, such as the bends of a circuit. In addition, the liquid can vaporize on leaving the equipment, which gives rise to accident risks.

Another known draining procedure consists of using a suction pump operated by an electric or heat motor. However, the suction of a corrosive or flammable liquid with such a pump would constitute a hazardous solution, which would be unsatisfactory in view of the vital requirements mentioned hereinbefore.

Finally, there are certain cases where the draining of an equipment takes place by means of the vacuum created by a venturi. This draining procedure has the advantage of making it possible to remove a highly corrosive or flammable product without any suction risk. However, it cannot be used on certain hydraulic circuits of aircraft, because said circuits are equipped with calibrated valves which only open when a certain pressure is applied thereto.

SUMMARY OF THE INVENTION

The present invention specifically relates to an improved draining means, whose original design, based on the use of a venturi for draining at least one more hydraulic equipment, also makes it possible to open any valves which may be present on such equipment, without the opening of said valves introducing any risk of liquid being sprayed to the outside, even in the case of an incorrect manipulation on the part of the operator.

According to the invention, this result is obtained by means of a hydraulic equipment draining means containing a liquid and having at least one outlet connection and optionally at least one inlet connection and at least one calibrated closing member, said draining means comprising a reception reservoir for the liquid and is characterized in that it also comprises;

- at least one suction line able to tightly connect the reservoir to the outlet connection of at least one hydraulic equipment to be drained,
- a first venturi issuing into the top of the reservoir,
- a compressed air line able to connect a control orifice of the first venturi to an external compressed air source and
- at least one opening line able to connect the compressed air line to the inlet connection of the equipment to be drained, when said inlet connection exists, in order to inject compressed air into the equipment at a pressure above an opening pressure of the calibrated closing member, but inadequate to produce a pressure above atmospheric pressure in the outlet connection.

As a result of an external compressed air source such as a compressed air system or a compressed air cylinder, said draining means makes it possible to transfer into the reservoir the liquid to be drained coming from one or more hydraulic equipments.

Moreover, when the hydraulic equipments to be drained comprise a calibrated closing member such as a valve, the compressed air admitted by the opening line makes it possible to open said member without any risk of spraying liquid outside the circuit, by e.g. as a result of a connection not sealed due to an incorrect manipulation. Thus, the pressure injected into the circuit does not make it possible to create a pressure exceeding atmospheric pressure in the outlet connections of the circuit.

In a preferred embodiment of the invention, the draining means also comprises a draining line able to tightly connect the bottom of the reservoir to an external recovery tank, it being possible to fit a second venturi on the tank in order to issue into the top of the latter, and a branch compressed air line connecting the compressed air line to the second venturi. In this embodiment, the draining of the reservoir into the tank takes place under the same safety conditions as the draining of the hydraulic equipments.

Pressure measuring and pressure regulating means are preferably placed in the compressed air line, downstream of the opening line and upstream of the branch compressed air line.

In order to ensure that the liquid sucked into the reservoir by the venturi is not atomized out of the latter when the reservoir fills, liquid-air separating means, such as baffles, are advantageously placed in the upper part of the reservoir.

For the same reason, a sealing means is preferably placed in a passage connecting the first venturi and the reservoir, so as to seal said passage when the liquid level in the reservoir reaches a predetermined threshold.

In addition to the two latter means, each venturi issues to the outside through filtering means, which hold back any liquid particles present in the air discharged to the outside.

To facilitate the control of the draining means, at least one stop valve is placed in the compressed air line and in the opening line.

The invention is described in greater detail hereinafter relative to a non-limitative embodiment and the attached drawing in the form of a connection diagram for the different functional elements of a draining means according to the invention.

DRAWING

The single figure is a diagram of the hydraulic equipment draining system of the present invention.

DETAILED DESCRIPTION

In its preferred embodiment, the draining means according to the invention is in the form of a mobile trolley constituted by a not shown chassis equipped with casters. This chassis supports the different functional elements, which will now be described in conjunction with the single drawing.

The functional elements of the draining means comprise a reservoir 10 for receiving the liquid to be drained. This reservoir 10 makes It possible to store in its lower part a liquid volume preferably corresponding to the volume contained in several equipments to be drained. It is advantageously in the form of a vertically aligned reservoir.

The functional elements of the draining means also include at least one suction line 12. This line is a flexible line or pipe, whereof one end is connected to the reservoir 10, in the top of its lower part used for storing the liquid. The other end of the suction line 12 is connected by an appropriate, tight adapter 14, to an outlet connection of the hydraulic equipment C to be drained. The suction line 12 is equipped with a pressure gauge 13 making it possible to check the vacuum applied to the equipment to be drained.

In order to permit the draining of an equipment remote from the draining means. e.g. due to the fact that the latter cannot be brought into the immediate vicinity of the equipment, the suction line 12 is advantageously a very long line of e.g. 10 m. This long line is then placed on a not shown reel installed on the chassis of the draining means.

It should also be noted that the draining means according to the invention can be used for simultaneously draining several hydraulic equipments. For this purpose it can be equipped with several suction lines 12 separately connected to the reservoir 10 or, preferably, a single line terminated by a multiple connection used for the fitting of several lines connected to different circuits by appropriate adapters 14.

Moreover, the draining means can be equipped with a set of adapters permitting the use thereof on all existing connection types on equipments to be drained.

The reservoir 10 has an upper dome, into the centre of which issues a passage 18 connecting the inner volume of the reservoir 10 to a venturi 20. At its opposite end, the venturi 20 issues to the outside through a filter 22. The Venturi 20 makes it possible to create a vacuum in the reservoir 10 and in the hydraulic equipments C to be drained, by means of the suction line 12. This vacuum ensures the transfer into the reservoir 10 of the liquid initially contained in the hydraulic equipments C, as well as the drying of said circuits.

The control of the venturi 20, making it possible to create the aforementioned vacuum, is ensured by the compressed air. The compressed air is supplied by an external, not shown, compressed air source generally formed by a compressed air system available on the draining site. However, other external sources can be used, such as compressed air cylinders.

To make it possible to pass the compressed air from the aforementioned, external source to the venturi 20, the draining means according to the invention has a compressed air line 24. A first end of said line 24 is permanently connected to a control orifice of the venturi 20 and its opposite end is provided with a connector 25 permitting its connection to the aforementioned, compressed air source. The compressed air line 24 is a flexible line or pipe, preferably of considerable lengths e.g. 10 m, so as to permit the connection of the draining means to a compressed air source remote from the latter. The line 24 is then fitted to a not shown reel supported by the chassis of the draining means.

In the flow direction of the compressed air in the compressed air line 24, the latter has in order a stop valve 26, a pressure gauge 28, a regulator 30 and a second stop valve 32. These different members are accessible from the control station of the draining means equipping the chassis of the latter.

The hitherto described functional elements make it possible to drain and dry one or more hydraulic equipments C, in open circuit form into the reservoir 10. However, they are inoperative for draining hydraulic equipments equipped with members such as a calibrated valve 15 determining the flow direction of the liquid in said equipments.

In order to be able to drain such equipments, the draining means according to the invention also has at least one opening line 34, whereof a first end is connected to the compressed air line 24 between the stop valve 26 and the pressure gauge 28 and whereof the opposite and is connected to at least one inlet connection of the hydraulic equipment C having such a valve by means of an adapter 16.

In the flow direction of the compressed air in said opening line 34 are successively provided a stop valve 36, a pressure gauge 38, a regulator 40 and a pressure limiting valve 42. The stop valve 36 and pressure gauge 38 are accessible from the control station of the draining means. However, the regulator 40 and pressure limiting valve 42 are set in the factory, so that the opening of the valve 36 has the effect of injecting into the hydraulic equipment C in question a pressure with a value adequate for bringing about the opening of the valve or valves of said equipments. However, the value of the pressure applied to the equipments C by said opening line 34 remains inadequate for allowing the pressure in the outlet connection or connections of the equipments to exceed atmospheric pressure. A vaporization of the liquid outside said equipments by the outlet connections is consequently impossible, even in the case where one of the connections is not connected to the reservoir 10 as a result of a manipulating error on the part of the operator. Therefore, the security, safety and protection of the environment are maintained in all cases.

The draining means, whose functional elements are illustrated in the single drawing, is advantageously equipped with complimentary means making it possible to prevent any liquid escape outside the reservoir 10.

These means firstly comprise a liquid-air separator 44 located in the upper part of the reservoir 10 above the connection of the suction line 12. This separator can in particular be constituted by horizontal baffles in involute of a circle and vertical baffles optionally provided with filtering elements. It makes it possible to trap the liquid particles optionally entrained to the outside by air sucked in by the venturi 20.

Another safety equipment comprises a sealing means 46, such as a float placed in the duct 18 connecting the top of the reservoir 10 to the venturi 20. This sealing means 46 is normally spaced from the venturi 20, so as to keep the passage 18 in the open position. However, if the level of the liquid in the reservoir 10 accidentally increases in such a way that said liquid reaches the sealing means 46, the latter floats to the surface of the liquid and seals the inlet of the venturi 20. This prevents any escape of liquid to the outside.

The filter 22 placed at the outlet of the venturi 20 constitutes a third device making it possible to trap any liquid particles still present in the air expelled by the venturi 20.

In view of the fact that the number of equipments C liable to be simultaneously and/or successively drained into the reservoir 10 is limited, it is desirable to be able to periodically drain the latter into an external tank R provided for this purpose. The draining means illustrated in the drawing is designed in such a way that the draining of the reservoir 10 into the tank R takes place under the sate safety conditions as the draining of the hydraulic equipments C into the reservoir 10.

Thus, the functional elements of the draining means illustrated in the drawing also comprise a preferably flexible, draining line 48, whose one end is connected to the bottom of the reservoir 10. The opposite end of the line 48 is provided with a connection 50 for tight connection to the tank R. This connection 50 is normally closed and opens automatically when the connection is made.

Moreover, the draining means has a flexible, compressed air branch line 52, whereof a first end is connected to the compressed air line 24, between the regulator 30 and the stop valve 32. The opposite end of the line 52 is connected to a second venturi 54, which is fitted by a connection 56 to the tank R. The compressed air branch line 52 has a stop valve 60.

Under the effect of the compressed air admitted by the line 52, the second venturi 54 creates a vacuum in the tank R. The liquid contained in the reservoir 10 can consequently be transferred into the tank R without any risk of spraying to the outside.

A filter 58 is placed at the outlet of the second venturi 54 to trap any liquid particles possibly present in the air expelled to the outside.

The above description shows that the draining means according to the invention makes it possible to drain and dry hydraulic equipments and in particular circuits containing corrosive or dangerous liquids, without creating pollution and whilst guaranteeing the safety of operators.

In addition, these results can be obtained on hydraulic equipments with no preferred flow direction and on circuits equipped with calibrated members such as valves, which impose a flow direction.

The draining means according to the invention uses for the energy source the compressed air from an external source. Thus, it has no motor, mechanism or moving part which can be corroded by the drained liquid.

The draining means is advantageously equipped with means making it possible to drain the reservoir 10 to another tank in safety, as well as ancillary devices preventing the overflowing of the reservoir 10 and the ejection of liquid to the outside in any form.

In practice, the operator connects the reservoir 10 to at least one equipment C to be drained by the suction line or lines 12 and, if necessary, the opening line or lines 34. He also connects the venturi 20 to an external compressed air source by means of the compress air line 24.

After opening the valves 26, 32 and optionally 36, the compressed air is injected into the venturi 20 and, at a limited pressure level, into the hydraulic equipments equipped with valves. A vacuum of approximately 60 mbars is then created in the reservoir 10 for a compressed air supply pressure of the venturi 20 of between 4.5 and 5.5 bars. Under the effect of the thus created vacuum in the reservoir, the liquid contained in the hydraulic equipments C is sucked into the reservoir and the equipments are dried. The opening of the valves of the hydraulic equipments is ensured by the low pressure injected by the opening line 34. In practice, this pressure is set in the factory to e.g. approximately 1 bar.

After the hydraulic equipments connected to the reservoir have been drained, the adaptor or adaptors 16 are disconnected therefrom and the sane operation can be performed on other hydraulic equipments.

When the liquid level in the reservoir 10 reaches a certain level, it is drained into the tank R by connecting to the latter the draining line 48, as well as the branch compressed air line 52 equipped with the venturi 54. The opening of the stop valve 60 equipping the line 52 has the effect of creating in the tank R a vacuum due to the action of the venturi 54. Under the action of this vacuum, the reservoir 10 is drained into the tank R by the line 48. This operation is performed in complete safety, in the same way as the draining of the hydraulic equipments into the reservoir 10.

We claim:

1. Draining means for draining at least one hydraulic equipment containing a liquid and having at least one outlet coupling and at least one calibrated closing member imposing a flow direction of the liquid in said equipment, said draining means comprising:

- a reception reservoir for said liquid;
- at least one suction line tightly connecting the reception reservoir to said at least one outlet coupling;
- a first venturi connecting a top of the reception reservoir to an outside;
- a compressed air line connecting a control orifice of the first venturi to an external compressed air source; and
- at least one opening line connecting the compressed air line to said at least one inlet coupling, for injecting compressed air into the equipment at a pressure that is above an opening pressure of said at least one calibrated closing member, but inadequate to produce a pressure above atmospheric pressure in the at least one outlet coupling of the hydraulic equipment.

2. Draining means according to claim 1, further comprising a draining line tightly connected between a bottom of the reservoir to an external reception tank, further comprising:

- a second venturi which is fitted to the external reception tank to connect the second venturi to a top of the reception tank; and
- a branch compressed air line for connecting the compressed air line to the second venturi.

3. Draining means according to claim 2, wherein a pressure measuring means and a pressure regulating means are connected to the compressed air line downstream of the at least one opening line and upstream of the compressed air branch line.

4. Draining means according to claim 2, wherein each venturi issues outside of the draining means through a filtering means.

5. Draining means according to claim 1, wherein the reception reservoir has in an upper part thereof, a liquid-air separating means.

6. Draining means according to claim 1, wherein a sealing means is placed in a passage connecting the first venturi and the reception reservoir, for sealing said passage when a liquid level in the reservoir reaches a predetermined threshold.

7. Draining means according to claim 1, wherein the compressed air line and opening line are respectively provided with at least one stop valve.

* * * * *